United States Patent [19]
Helmer et al.

[11] 3,744,343
[45] July 10, 1973

[54] ELASTIC PLUG-TYPE PIPE CONNECTION

[75] Inventors: Josef Helmer, Aich Kr Nurtingen; Georg Eltze, Stuttgart-Riedenberg, both of Germany

[73] Assignee: Daimler-Benz Aktiengesellschaft, Stuttgart-Unterturkheim, Germany

[22] Filed: Mar. 30, 1971

[21] Appl. No.: 129,533

[30] Foreign Application Priority Data
Apr. 1, 1970    Germany............... P 20 15 411.4

[52] U.S. Cl............ 74/645, 277/178, 277/208, 285/110, 285/175, 285/370
[51] Int. Cl........................................... F16h 47/00
[58] Field of Search................. 285/175, 119, 345, 285/397, 347, 190, 371, 120, 370, 110, 134, DIG. 22, 169, 374, 95, 31, 24, 32, 27; 277/178, 208; 74/645

[56] References Cited
UNITED STATES PATENTS

| | | | |
|---|---|---|---|
| 2,366,814 | 1/1945 | Smith | 285/110 |
| 2,591,531 | 4/1952 | Fishbock | 285/27 X |
| 2,649,105 | 8/1953 | Stout et al. | 285/110 X |
| 2,750,210 | 6/1956 | Trogdon et al. | 285/110 |
| 2,782,658 | 2/1957 | Schaefer et al. | 74/645 |
| 3,216,751 | 11/1965 | Dermott | 285/370 X |
| 3,129,960 | 4/1964 | Schrodt | 285/95 |
| 3,224,798 | 12/1965 | Housmann | 285/370 X |

Primary Examiner—Dave W. Arola
Attorney—Craig, Antonelli, Stewart & Hill

[57] ABSTRACT

An elastic plug-type pipe connection for the pressure medium in transmission parts, especially a connection between the shifting plate of an automatic motor vehicle transmission and of a distributor member associated with the shaft of the transmission, in which a bush serving as distributor member is mounted on the shaft and is secured against rotation; a connecting pipe section is provided at both ends with elastic sealing bushes and is inserted with the latter into essentially funnel-shaped apertures at the shifting plate and at the oil distributor bush until the end faces of the elastic sealing bushes abut sealingly against the corresponding surfaces of the apertures.

10 Claims, 2 Drawing Figures

Patented July 10, 1973
3,744,343
FIG. 1
FIG. 2
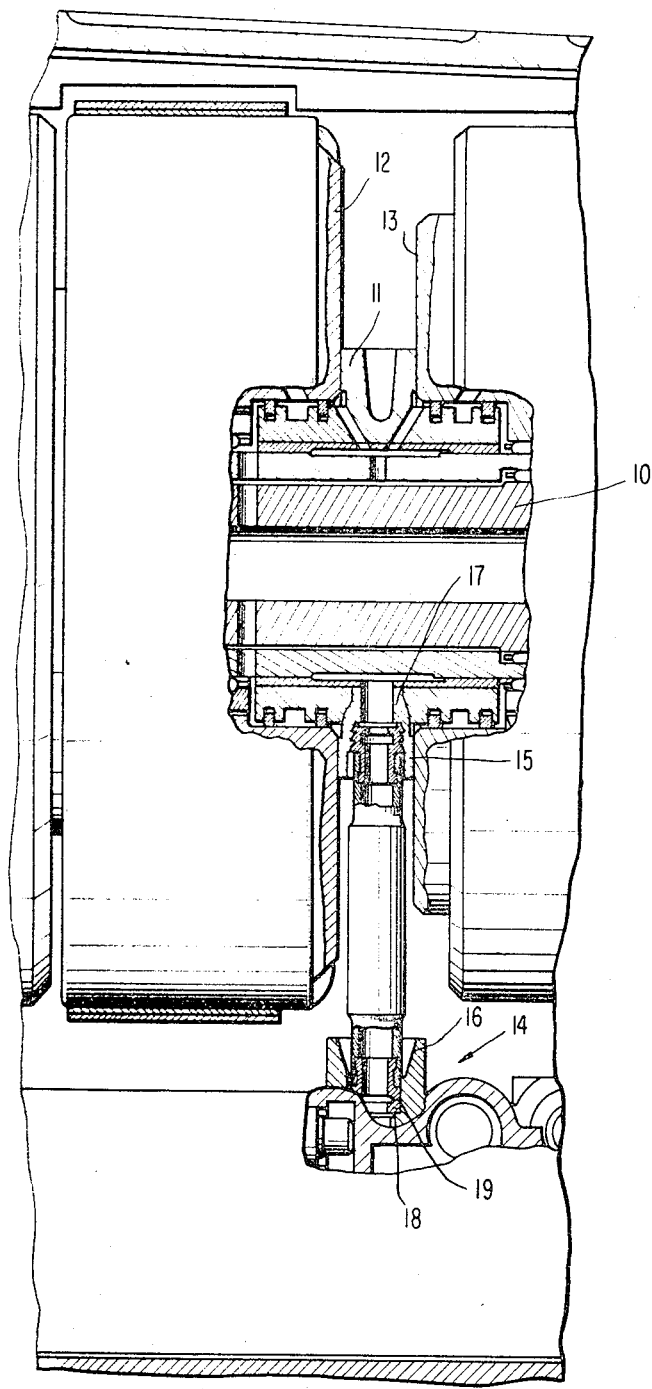
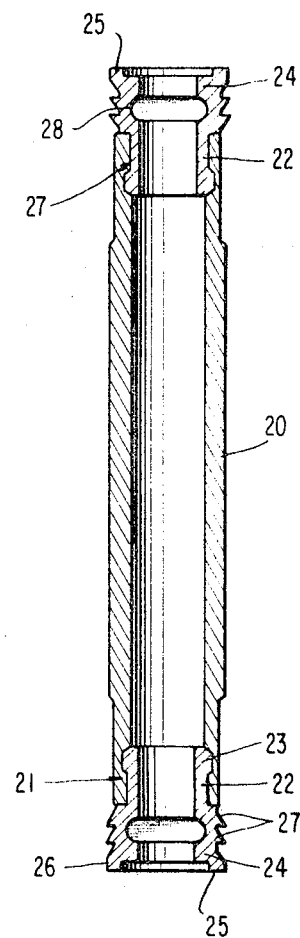
INVENTORS
JOSEF HELMER
GEORG ELTZE
BY Craig, Antonelli, Stewart & Hill
ATTORNEYS

ELASTIC PLUG-TYPE PIPE CONNECTION

The present invention relates to an elastic plug-type pipe connection with lateral possible offset for the pressure medium in transmission parts, especially a connection between the shifting plate of an automatically shifting motor vehicle transmission and of a distributor member coordinated to the shaft of the transmission, for example, in the form of a center wall.

Plug-type pipe connections of the aforementioned types were sealed heretofore in a relatively simple manner, for example, by means of O-rings. However, the desire frequently exists nowadays to omit the center wall of the transmission and to replace the same by another oil distributor member. In this case the known seals are no longer sufficient because both radial as well as axial movements may occur at the new oil distributor member and as a result thereof an excessive wear may occur at the seals.

The present invention is concerned with the task to provide a solution to this problem. The underlying problems are solved according to the present invention with a connection of the aforementioned type in that a bush mounted on the shaft and secured against rotation serves as distributor member, and in that a pipe section is provided at both ends with elastic sealing bushes and is inserted by means of these elastic sealing bushes into essentially funnel-shaped apertures at the shifting plate and at the distributor bush up to sealing abutment at the end face.

The plug-type pipe connection according to the present invention entails the advantage that it can follow all movements of the oil distributor bush without difficulties and without impairing the sealing effect, which is realized by axial pressure fit or abutment at the end faces of the seal. Also, the assembly is considerably more simple than heretofore.

In one embodiment according to the present invention, the plug-in apertures are provided with a cylindrical portion adjoining the funnel portion in the inner section thereof, which serves for the lateral support of the elastic sealing bushes. It is thereby further within the scope of the present invention if the two sections of the aperture pass over into one another or are formed by a single slightly conically shaped opening.

It is additionally proposed by the present invention that the elastic sealing bushes are inserted with the neck portion thereof into the pipe section and are secured thereat by corresponding annular bulges, and in that the elastic sealing bush is provided adjacent thereto with a sealing section which includes at its end both a sealing end surface as well as a circumferential surface for the support with respect to the aperture. The elastic sealing bush is thereby appropriately provided within the sealing section with saw-tooth-shaped lips on the outside thereof, which lips directed forwardly, i.e., in the direction toward the funnel interior. Finally, it is also proposed according to the present invention that the elastic sealing bush is provided within the sealing section inwardly thereof with an annular groove approximately semi-circularly-shaped in cross-section.

Accordingly, it is an object of the present invention to provide an elastic plug-type pipe connection which avoids by simple means the aforementioned shortcomings and drawbacks.

Another object of the present invention resides in a plug-type pipe connection which permits both relative axial and radial movement of the parts to be connected thereby.

A further object of the present invention resides in an elastic plug-type connection for automatic motor vehicle transmissions which not only permits a lateral dislocation of the parts, but assures completely satisfactory seal during all movements of the parts to be connected thereby.

Still another object of the present invention resides in an elastic plug-type pipe connection of the type described above which involves relatively few and simple parts, permitting a considerably simplified assembly.

These and other objects, features, and advantages of the present invention will become more obvious from the following description when taken in connection with the accompanying drawing which shows, for purposes of illustration only, one embodiment in accordance with the present invention, and wherein:

FIG. 1 is a partial longitudinal axial cross-sectional view through a transmission part with a plug-type pipe connection in accordance with the present invention; and FIG. 2 is a longitudinal cross-sectional view through the plug-type pipe itself.

Referring now to the drawing wherein like reference numerals are used throughout the two views to designate like parts, and more particularly to FIG. 1, an oil distributor bush or sleeve 11 is supported in this figure on the shaft 10 of an automatically shifting motor vehicle transmission. This bush 11 is secured laterally against rotation in a conventional manner (not shown). The bush 11 is located between drum-shaped parts 12 and 13 within which are arranged shifting clutches for the transmission. The transmission itself has any known desired construction, not illustrated in detail. Within the transmission housing, the shifting plate generally designated by reference numeral 14 is disposed underneath the drum-shaped parts 12 and 13; the shifting plate 14 controls in a conventional manner the engagement of the speeds in the transmission. A plug-type pipe connection is interposed between the shifting plate 14 and the oil distributor bush 11 as transmitting member for the pressure medium.

Funnel-shaped plug-in apertures 15 and 16 are provided at the oil distributor bush 11 and at the shifting plate 14. These plug-in apertures 15 and 16 may be connected with the bush 11 and the shifting plate 14 as separate parts or may be constituted by the same. The insertion openings 15 and 16 have inwardly thereof sealing surfaces 17 and 18 extending perpendicularly to the axis so that the plugged-in or inserted seals can abut thereagainst with the end face thereof. The aperture 15 itself is constructed of quite slightly conical shape so that the inner section thereof may serve for the radial support of the elastic seal at the plug-type pipe connection. A separate section 19 with a cylindrical or slightly conical circumference is provided for that purpose at the shifting plate 14 in the funnel opening 16 inwardly thereof.

The connecting element for this plug-type pipe connection is constituted according to FIG. 2 of a pipe section 20 which is provided at each end with an elastic sealing bush generally designated by reference numeral 21. This sealing bush 21 is inserted with a retaining section 22 into the pipe section 20 and is secured at the pipe section by means of a bulge or bead 23 within a corresponding groove. The portion of the sealing bush 21 projecting out of the pipe 20 forms the sealing section 24, whereby the seal, properly speaking, is realized by means of the end surface 25. However, a circumferential surface 26 adjoins directly the end face 25 whence the bush 21 is supported laterally in the funnel opening, i.e., it cannot rub and wear at the end faces thereof during axial movements of the oil distributor bush 11. Saw-tooth-shaped annular lips 27 are arranged at the outer circumference of the sealing section 24 for the further lateral support and simultaneously also for the sealing which are directed toward the funnel interior. Inwardly thereof, the bush 21 is provided with an annular groove 28 in the sealing section 24 thereof which may be semi-circularly shaped in cross section. This annular groove 28 serves for producing a sufficient yieldingness of the elastic sealing bush both in the longitudinal direction of the plug-type pipe connection—in order to produce or maintain the necessary pressure seal at the end faces 25—as also in the cross direction with respect thereto. As a result of the axial prestress in particular a "wear" or "working" of the seal at the end faces is precluded.

While we have shown and described only one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. An elastic plug-type pipe connection for the pressure medium of transmission parts, particularly as connection between a shifting plate of an automatic transmission and a distributor element for the pressure medium, coordinated to a shaft of the transmission, characterized in that a bush means serves as the distributor element for the pressure medium said bush means being supported on said shaft and being secured against rotation, and a pipe means provided at both ends thereof with elastic sealing bush means and aperture means including a substantially funnel shaped portion at one end thereof and sealing abutments at the other end, said pipe means inserted with said sealing bush means into said approximately funnel-shaped portion into contact with said sealing abutment, the aperture means being provided at the shifting plate means and at the distributor bush means such that the pipe means serves for transmitting the pressure medium via the aperture means between the shifting plate means and the distributor bush means.

2. A connection according to claim 1, characterized in that said aperture means includes, directly adjoining said funnel-shaped portion, an approximately cylindrical portion in the inner section thereof, which serves for the lateral support of the elastic sealing bush means.

3. A connection according to claim 2, characterized in that said elastic sealing bush means includes a neck portion and is inserted with its neck portion into the pipe means and is secured thereat by corresponding annular bead means, and in that the elastic sealing bush means includes adjacent the neck portion a sealing section which is provided at the end thereof with a sealing end surface and also with a circumferential surface for the support with respect to the aperture means.

4. A connection according to claim 3, characterized in that the elastic sealing bush means is provided in the sealing section outwardly thereof with approximately saw-tooth-shaped lip means that are directed toward the interior of the funnel-shaped aperture means.

5. A connection according to claim 4, characterized in that the elastic sealing bush means has an annular groove approximately semi-circularly shaped in cross section on the inside thereof within the area of its sealing section.

6. A connection according to claim 1, characterized in that said elastic sealing bush means includes a neck portion and is inserted with its neck portion into the pipe means and is secured thereat by corresponding annular bead means, and in that the elastic sealing bush means includes adjacent thereto a sealing section which is provided at the end thereof with a sealing end surface and also with a circumferential surface for the support with respect to the aperture means.

7. A connection according to claim 6, characterized in that the elastic sealing bush means is provided in the sealing section outwardly thereof with approximately saw-tooth-shaped lip means that are directed toward the interior of the funnel-shaped aperture means.

8. A connection according to claim 1, characterized in that the elastic sealing bush means has an annular groove approximately semi-circularly shaped in cross section on the inside thereof within the area of its sealing section.

9. A connection according to claim 8, characterized in that said elastic sealing bush means includes a neck portion and is inserted with its neck portion into the pipe means and is secured thereat by corresponding annular bead means, and in that the elastic sealing bush means includes adjacent the neck portion a sealing section which is provided at the end thereof with a sealing end surface and also with a circumferential surface for the support with respect to the aperture means.

10. A connection according to claim 1, characterized in that the elastic sealing bush means is provided in the sealing section outwardly thereof with approximately saw-tooth-shaped lip means that are directed toward the interior of the funnel-shaped aperture means.

* * * * *